Figure 1:
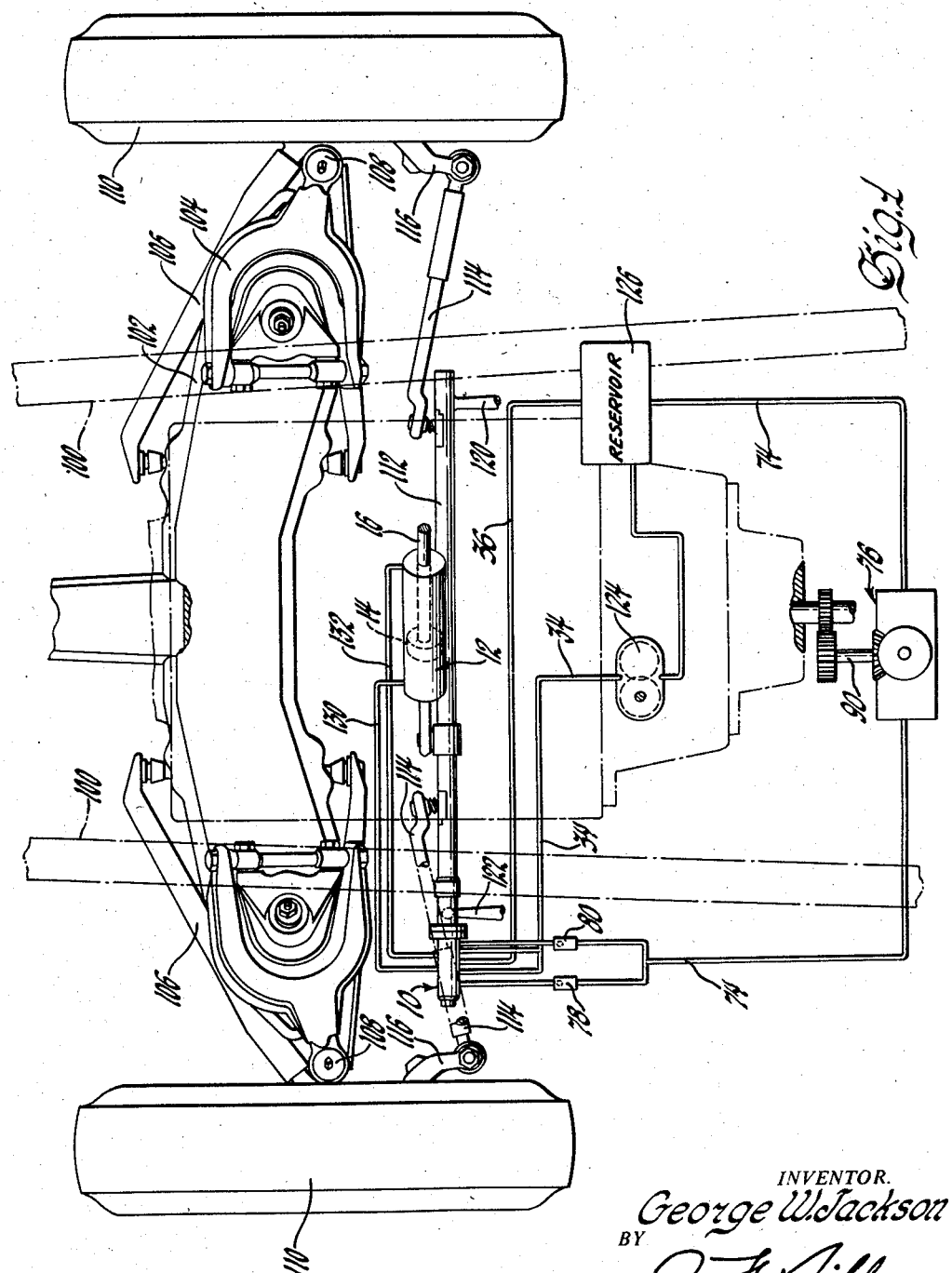

United States Patent Office 2,893,504
Patented July 7, 1959

2,893,504

HYDRAULIC STEERING SYSTEM WITH CONTROL MEANS FOR VALVE REACTION PRESSURES

George W. Jackson, Dayton, Ohio, assignor to General Motors Corporation, Detroit, Mich., a corporation of Delaware Application December 30, 1954, Serial No. 478,720

6 Claims. (Cl. 180—79.2)

This invention concerns a reaction valve, by which is meant a valve of the type employed in a servo system to control fluid flow to and from an actuator or fluid motor linked to a part desired to be actuated, the valve including a chamber supplied with pressure fluid operating to impose a resistance to movement of a manually controlled valve part so as to create an artificial "feel." In its most particular aspect the invention concerns a valve of the indicated characteristic, which is especially adapted for use in the fluid power steering of automotive and similar vehicles.

As applied in a fluid power steering gear, the control valve for the fluid motor, which may be operatively connected to substantially any steering member, is manually actuated through the steering shaft, either directly or indirectly, the movement of the valve thus induced causing the development of a pressure differential across the piston in the motor so as to bring about the desired powered turning of the dirigible wheels. The source of the required fluid pressure is normally a suitable pump operated through a take off from the engine of the vehicle and connected to the valve directly or through an accumulator maintained at a predetermined pressure by the pump. Since the operator would otherwise lack an adequate sense of feel at the steering wheel assuring proper control of the vehicle, it is conventional to install in the valve or in association therewith means provided an artificial resistance to turning of the wheel. While such means may be purely mechanical as a spring, for instance, according to the better practice a chamber is provided in the valve which is open at all times to the pump or accumulator as the case may be, the developing pressure being applied as a resistance to displacement of the valve. Frequently, the fluid resistance may be additive to a spring resistance.

In the operation of such a gear, it should be apparent on reflection that since the fluid pressure in the chamber corresponds to that prevailing in the motor and since the pressure in the motor is a function of the steering resistance, the resistance to turning of the steering wheel imposed by the fluid pressure in the chamber will be greatest at maximum steering resistance which, of course, occurs as during parking or maneuvering in close quarters at low speeds.

Although the foregoing represents a desideratum in that the resistance sensed at the wheel is maximum when the steering resistance is actually greatest, this proportionality in the present systems does not hold true throughout the range of vehicle speed; in fact at highway cruising speeds, i.e., speeds above about 30 m.p.h., the resistance to steering may be substantially constant. The lack of relationship between the sensed steering resistance and the actual steering resistance at the indicated speeds is objected to in many quarters. A further objection goes to the effort which must be applied at the steering wheel at low speeds in order to overcome the imposed fluid resistance.

The present invention has for its principal object to provide means whereby the resistance sensed at the steering wheel is made proportionate to the actual steering resistance irrespective of speed. A further object is to provide means in association with the first-mentioned means operating to limit the fluid reaction at low vehicle speeds to a predetermined maximum to the end of reducing the effort at the steering wheel at such speeds.

Other objects and features of the invention will be apparent from the following specific description which will proceed with the aid of the drawings wherein—

Figure 2:
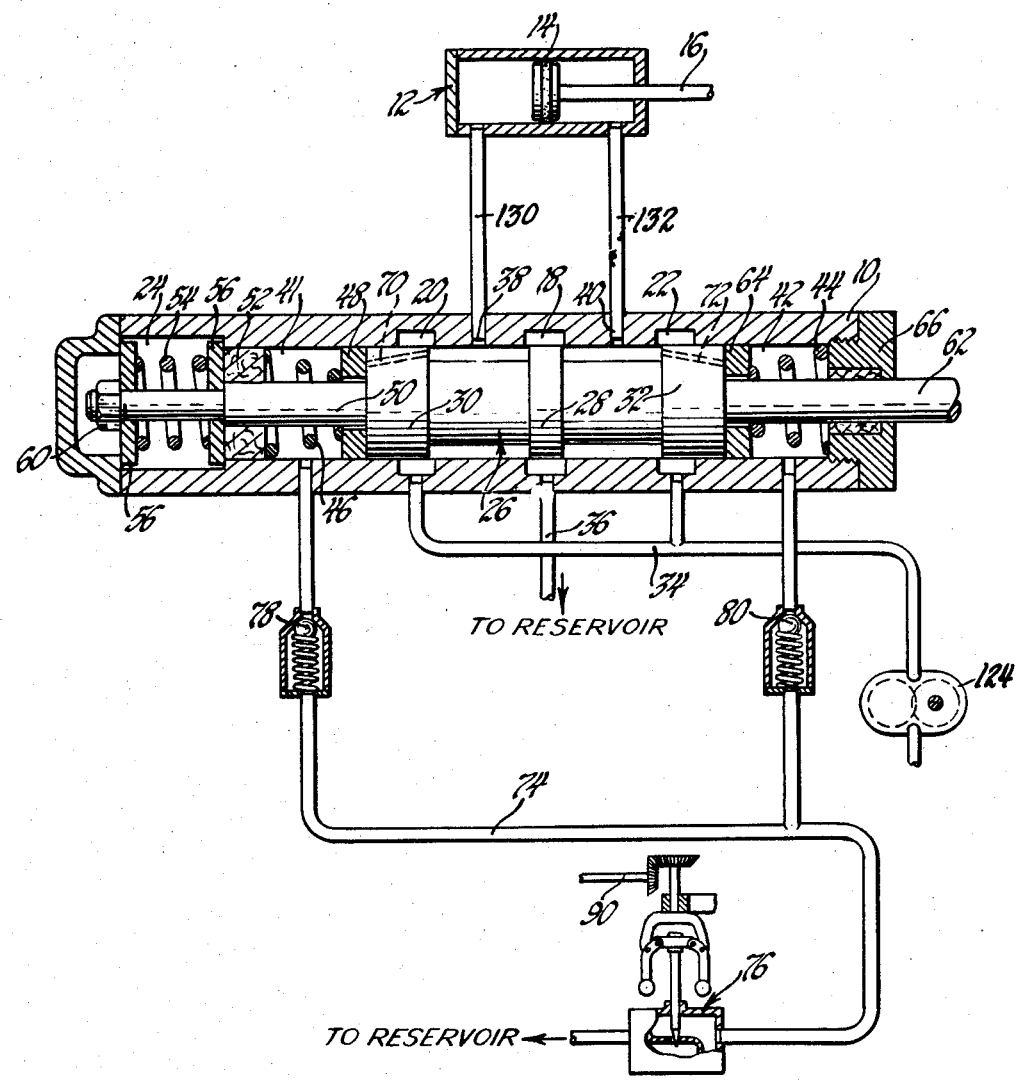

Figure 1 is a plan showing the front portion of the chassis of a vehicle, the vehicle being equipped in accordance with the invention; and Figure 2 is an essentially diagrammatic drawing showing parts appearing in Figure 1.

Referring first to Figure 1, the numeral 100 denotes the side rail components of the vehicle frame, such components being interconnected by a cross member 102. As shown, the vehicle is provided with an independent front suspension of a conventional type including spring-spaced control arms 104 and 106 and steering knuckles 108, directly connected to the dirigible wheels 110. Steering of the wheels 110 is accomplished via a linkage comprising a relay rod 112, tie rods 114 and steering knuckle arms 116. Relay rod 112 is supported at its right-hand end by an idler arm 120 and at its opposite end by a pitman 122 which is manually actuated through reduction gearing by the operator of the vehicle.

To assist the manually applied effort, there is provided a hydraulic jack 12, the cylinder component of which is connected to the reach rod 112. The shaft 16 of the piston 14 is pivotally supported by a fixed member, not shown. The jack or power cylinder 12 is under the control of a valve 10 carried at the left-hand end of the relay rod 112. A pump 124 drawing from a reservoir 126 supplies pressure fluid to the valve for operation of the jack.

Within the housing of the valve, 10 is a spool element 26 (Figure 2) having lands 28, 30, and 32 functional with relation to three annular channels 18, 20, and 22 respectively, formed by the boring and counterboring of the housing. Channels 20 and 22 connect with the inlet line 34 from the pump 124, while annular channel 18 connects with a return line 36 to the reservoir 126. Passageways 38 and 40 located in the valve body between the central channel 18 and the channels 20 and 22 connect with conduits 130 and 132 extending to the opposite ends of the cylinder component of the jack or fluid motor 12.

At either end of the valve spool is a reaction chamber 41, 42 containing a spring 44, 46, each spring representing a resistance to movement of the spool 26 in its direction. Spring 46 exerts its force against a ring 48 having a sliding fit over the stem 50 and against a sealing ring 52.

Stem 50 is reduced in diameter within a chamber 24 wherein it is surrounded by a spring 54 and rings 56. A nut 60 is threaded on the end of the stem and receives the thrust of the outer of the rings 56.

At the other end of the valve structure, there will be seen a second stem 62 which, like stem 50, may be integrally formed with the speel 26. The stem 62 is surrounded by a ring 64 having a sliding fit thereover and extends through a plug 66, threaded into the housing 10, for operative connection with the pitman 122.

It will be observed that the valve as represented is of the "open-center" type, i.e., fluid from the pump, with the valve spool centered as shown, circulates through the valve against the static pressure of the fluid in the motor 12. Assuming a turn in one direction or the other, the spool will be displaced as determined by the direction the steering wheel is rotated to partially or completely prevent fluid flow to one end of the motor. This creates a pressure differential across the piston 14, causing movement of the piston and its shaft with powering of the steering part to which the shaft is connected.

As before explained, the spool movement is against the resistance of one of the springs 44, 46. Also there must be overcome the resistance of the fluid in the chamber containing the spring, such fluid gaining access to the chamber through one of the orifices 70, 72 which extend diagonally through the end lands of the spool.

Spring 54 in the chamber 24 functions to maintain the valve spool in its normal centered position within the housing 10. The resistance imposed thereby is manifestly the same irrespective of the direction of displacement of the spool.

Each chamber 40, 42 will be seen as communicating with a common exhaust line 74 to the pump reservoir. This line 74 has therein a valve 76, the position of which is determined by vehicle speed. Thus, the valve may be governor controlled, with rotation of the governor being effected as shown by the vehicle propeller shaft via suitable gearing 90. The weighting of the governor is such that when the vehicle speed is below about say 10 m.p.h., the valve is in open position, whereas the speed of the vehicle increases above the indicated value it progressively closes so that at maximum vehicle speed the valve is in substantially fully closed position.

With the valve 76 fully open, the maximum pressure which may develop within the chambers 40, 42 is determined by the spring loading of the ball check valves 78 and 80 disposed in the lines extending from the chambers to the common exhaust line 74. According to the invention, this maximum pressure is set at a value substantially lower than the pressures which may develop in the valves heretofore employed. Thus, the effort required at the steering wheel during parking and low speed maneuvering is much less than demanded by conventional power steering gears of the general type here involved.

The progressive closing of the valve 76 as the vehicle speed increases above 10 m.p.h., which it is to be understood represents an arbitrarily selected figure tends, of course, to retard exhaustion of fluid from the chambers. This does not mean, however, that the effort required at the steering wheel to displace the valve spool progressively increases, because as a consequence of the increasing speed the steering resistance progressively decreases, a condition calling for progressively less pressure in the fluid motor to power the turning of the dirigible wheels and the development of progressively less pressure in the reaction chambers. Rather, the progressive closing of the governor valve operates to compensate for the decreasing pressure in the reaction chambers as the vehicle speed increases so that the resistance sensed at the wheel is greater than in the case of the prior gears and truly proportionate to the actual steering resistance.

Having thus described and illustrated my invention, what I claim is:

1. In an automotive vehicle having a steering linkage member, a fluid system including a source of fluid pressure, a fluid motor operably connected to said steering linkage member, valve means controlling the flow of fluid to said motor, said valve means comprising reaction chamber means into which pressure fluid is introduced, such fluid tending to resist displacement of the valve, conduit means for exhaust fluid from said reaction chamber means, a valve in said conduit means, and means controlling said last valve, such means being operated by the engine of the vehicle at a speed bearing a fixed relation to the speed of the vehicle whereby fluid is bled from said reaction chamber means to decrease the resistance to displacement of said first valve means as the vehicle speed decreases.

2. In an automotive vehicle having a steering linkage member, a fluid system including a source of fluid pressure, a fluid motor operably connected to said steering linkage member, valve means controlling the flow of fluid to said motor, said valve means comprising reaction chamber means into which pressure fluid from said source is introduced, such fluid tending to resist displacement of the valve, conduit means for exhaust fluid extending from said reaction chamber means, a valve in said conduit means, and a governor controlling said last valve operated by the engine of the vehicle at a speed bearing a fixed relation to the speed of the vehicle whereby fluid is bled from said chamber means to decrease the resistance to displacement of said first valve means as the vehicle speed decreases.

3. In an automotive vehicle having a steering linkage member, a fluid system including a source of fluid pressure, a fluid motor operably connected to said steering linkage member, valve means controlling the flow of fluid to said motor, said valve means comprising reaction chamber means into which pressure fluid from said source is introduced, such fluid tending to resist displacement of the valve, conduit means for exhaust fluid extending from said reaction chamber means, a check valve in said conduit means, a valve in said conduit means, and means controlling said last valve, such means being operated by the engine of the vehicle at a speed bearing a fixed relation to the speed of the vehicle whereby fluid is bled from said reaction chamber means to decrease the resistance to displacement of said first valve means as the vehicle speed decreases.

4. In an automotive vehicle having a steering linkage member, a fluid system including a source of fluid pressure, a fluid motor operably connected to said steering linkage member, valve means controlling the flow of fluid to said motor, said valve means comprising an axially movable spool component and a reaction chamber at either end of such spool component into which pressure fluid from said source is introduced, such fluid tending to resist displacement of said spool component, a conduit for exhaust fluid extending from each said reaction chamber to a common exhaust line, said conduits each having a check valve therein, a valve in said common exhaust line, and a governor controlling said last valve operated by the engine of the vehicle at a speed bearing a fixed relation to the speed of the vehicle whereby fluid is bled from said reaction chambers to decrease the resistance to displacement of said spool component as the vehicle speed decreases.

5. A fluid power steering gear for automotive vehicles and the like, including a source of fluid pressure, a fluid motor adapted for operative connection to a steering part and a valve for controlling fluid flow between said source and said motor, said valve including a pair of telescopically related members one of which is movable relative to the other the movable member being operably connected to a manually actuated steering part, means defining a chamber adapted to receive pressure fluid from said source operating to provide a resistance to movement of said movable member, conduit means for supplying pressure fluid to said chamber, an exhaust line connected to said chamber, a governor-controlled throttle valve in said exhaust line, means driven by the vehicle at a rate bearing a fixed relation to vehicle speed operatively connected to said governor to rotate the same, said throttle valve controlling the pressure in said chamber and hence the degree of resistance imposed to movement of said movable member so that such resistance is rendered proportionate to the actual steering resistance throughout the cruising speed range of the vehicle, and a ball check valve in said exhaust line mediate said chamber and said throttle valve means, said ball check valve determining the maximum pressure in said chamber when the fluid supplied thereto is under maximum pressure, said throttle valve being then fully open.

6. A fluid power steering gear for automotive vehicles and the like including a source of fluid pressure, a fluid motor adapted for operative connection to a steering part and a valve for controlling fluid flow between said source and said motor, said valve including a pair of telescopically related members of generally cylindrical conformation the inner of which is axially movable relative to the other, said movable member being operably connected to a manually actuated steering part, means defining a chamber at either end of said inner member adapted to receive pressure fluid from said source, such fluid operating to provide a resistance to movement of the movable member, conduit means for supplying pressure fluid to said chamber, a separate exhaust line extending from each of said chambers and connecting with a common exhaust conduit, a governor-controlled throttle valve in said last conduit, means driven by the vehicle at a rate bearing a fixed relation to vehicle speed operatively connected to said governor to rotate the same, said throttle valve controlling the pressure in said chambers and hence the degree of resistance imposed to movement of said movable member so that such resistance is rendered proportionate to the actual steering resistance throughout the cruising speed range of the vehicle, and a ball check valve in each of said exhaust lines interconnecting with said exhaust conduit, said ball check valves determining the maximum pressure in said chambers when the fluid supplied thereto is under maximum pressure, said throttle valve being then fully open.

References Cited in the file of this patent
UNITED STATES PATENTS 2,596,242     Hill _____ May 13, 1952